United States Patent
Jiang et al.

(10) Patent No.: US 7,582,694 B2
(45) Date of Patent: Sep. 1, 2009

(54) ANTIMICROBIAL LUBRICANT FOR WOOD FIBER-PLASTIC COMPOSITES

(75) Inventors: Xiao Jiang, Emerson, NJ (US); Ahmed M. Tafesh, Allentown, PA (US); Joseph B. Williams, Easton, PA (US); Howard A. Cash, Middlesex, NJ (US); Kenneth S. Geick, Mercerville, NJ (US)

(73) Assignee: Lonza, Inc., Fair Lawn, NJ (US)

( * ) Notice: Subject to any disclaimer, the term of this patent is extended or adjusted under 35 U.S.C. 154(b) by 629 days.

(21) Appl. No.: 10/526,784

(22) PCT Filed: Aug. 29, 2003

(86) PCT No.: PCT/US03/27059

§ 371 (c)(1),
(2), (4) Date: Jul. 6, 2005

(87) PCT Pub. No.: WO2004/022846

PCT Pub. Date: Mar. 18, 2004

(65) Prior Publication Data

US 2005/0256231 A1    Nov. 17, 2005

Related U.S. Application Data

(60) Provisional application No. 60/408,251, filed on Sep. 4, 2002.

(51) Int. Cl.
*C08K 5/19* (2006.01)
*C08K 5/41* (2006.01)
(52) U.S. Cl. .................................. 524/186; 524/156
(58) Field of Classification Search ................. 524/156, 524/186
See application file for complete search history.

(56) References Cited

U.S. PATENT DOCUMENTS

| 4,480,061 A | 10/1984 | Coughlin |
| 4,680,328 A | 7/1987 | Dohrer |
| 4,833,181 A * | 5/1989 | Narukawa et al. ............. 524/13 |
| 5,130,352 A | 7/1992 | Chow |
| 5,206,325 A | 4/1993 | Hata |
| 5,288,775 A | 2/1994 | Bischoff |
| 5,970,916 A | 10/1999 | Yoder |

FOREIGN PATENT DOCUMENTS

| GB | 1014539 | 12/1965 |
| JP | 120342 A | 5/1988 |

OTHER PUBLICATIONS

STN AN:1974:478633, Vasilenok et al., "Synthesis and study of tetrasubstituted ammonium salts as antistatics for plastics IV," Vesti Akedemii Navuk BSSR, Seryya Khimichnykh Navuk (1974), abstract.
Vasilenok et al., "Synthesis and study of tetrasubstituted ammonium salts as antistatics for plastics IV," Vesti Akedemii Navuk BSSR, Seryya Khimichnykh Navuk (1974) No. 2, pp. 66-69.

* cited by examiner

*Primary Examiner*—Kriellion A Sanders
(74) *Attorney, Agent, or Firm*—Hoffman & Baron, LLP

(57) ABSTRACT

The invention relates to a polymer-cellulosic fiber composition comprising a polymer, a cellulosic fiber, and a quaternary ammonium alkyl salt wherein the latter imparts antimicrobial properties to the composition and functions as a lubricant during the formation of the composition. The quaternary ammonium alkyl salts may be alkyl carboxylate, alkyl sulfate, alkyl sulphonate, alkyl phosphate, or alkyl phosphite. Certain of the salts are new compositions of matter. The method of extruding and the extrudate are also claimed.

12 Claims, No Drawings

ANTIMICROBIAL LUBRICANT FOR WOOD FIBER-PLASTIC COMPOSITES

This application is a national phase of International Application No. PCT/US2003/027059, filed Aug. 29, 2003, which was published in English as International Publication No. WO 2004/022846 and claims the benefit of U.S. Provisional Application No. 60/408,251, filed Sep. 4, 2002.

BACKGROUND OF THE INVENTION

With the rising cost of wood and the shortage of mature trees, there is a present need to find good quality substitutes for wood which will continue long into the future. Additionally, good quality wood substitutes are more durable and longer-lasting than wood since they are less susceptible to termite destruction and wood rot.

Over the past several years a growing market has emerged for the use of polymer-wood composites to replace traditional solid wood products in applications such as decking, windows, fencing, automobile interiors and pallets. Polymer-wood composites contain from about 30 to about 80 percent cellulosic fibers. Cellulosic fibers act as filler or reinforcement in the polymer-wood composites. One key to achieving a high quality polymer-wood composite is a thorough dispersion of cellulosic fiber in the polymer matrix. To achieve this, many leading producers of polyethylene-wood decking have found lubricants to be essential.

Polymer-wood composites containing higher concentrations of cellulosic fibers are more susceptible to attack by fungi. Therefore, a present need exists for a compound which can function not only as a lubricant but also as an antimicrobial. Such a compound should lower the cost, simplify the manufacturing process and achieve high quality polymer-wood products with better appearance, dimensional stability and decay resistance.

BRIEF SUMMARY OF THE INVENTION

This invention is directed to an extrudable and extruded polymer-cellulosic fiber composite comprising a polymer, e.g., high density polyethylene (HDPE), cellulosic fiber and a quaternary ammonium alkyl salt. Certain of these quaternary ammonium alkyl salt are new compositions of matter.

A further embodiment of the invention is a method of preventing decay of a polymer-wood composite comprising mixing a quaternary ammonium alkyl salt into an extrudable composition containing a polymer and cellulosic fibers before performing an extrusion process on the extrudable composition.

DETAILED DESCRIPTION OF THE INVENTION

It has been discovered that quaternary ammonium alkyl salts act as both a lubricant and a fungicide in the polymer-cellulosic composites.

The quaternary ammonium alkyl salts have the following general formula:

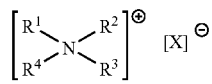

wherein X is an alkane carboxylate O—C(O)R, alkyl sulfate OS(O)$_2$OR, alkanesulfonate OS(O)$_2$R, alkyl phosphate OP(O)(OH)OR—, (O-)alkyl phosphonate OP(O)(H)—OR; R is an alkyl group having from 8 to 22 carbon atoms, and $R^1$ is a long chain alkyl group or a benzyl group and, where the $R^1$ group is a long chain alkyl group, $R^2$ and $R^3$ are short chain alkyl groups and $R^4$ is a short or long chain alkyl group and, where $R^1$ is a benzyl group, $R^2$ is a short chain alkyl group and $R^3$ and $R^4$ are each either short or long chain alkyl groups. The aforesaid long chain alkyl groups have from 8 to 22 carbon atoms, preferably from 10 to 18, and the short chain alkyl groups have from 1 to 4 carbon atoms, preferably 1 or 2.

Examples of the quaternary ammonium cation in the quaternary ammoniumalkyl salts include, but are not limited to, alkyldimethylbenzylammonium in which the alkyl group contains 1-25 carbon atoms, didecyldimethylammonium, alkyltrimethylammonium, octyldecyldimethylammonium, dioctyldimethylammonium, didecylmethylpropylammonium, didecylmethylbutylammonium, benzylhexadecyldimethylammonium, didecylmethyl-4-chlorobenzylammonium, didecylmethyl-3,4-dichlorobenzylammonium, decyloctyldimethylammonium, decyloctylbenzylmethylammonium, decyldodecyldimethylammonium, decyldodecylethylmethylammonium, dodecylbenzyldimethylammonium, tetradecylbenzyldimethylammonium, diundecyldimethylammonium, dinonylhydroxyethylmethylammonium, didecylhydroxypropylmethylammonium, and diundecyldihydroxyethylammonium, and combinations thereof. Blends of compounds containing dioctyl, didodecyl and decyloctyl compounds or didecyl, didodecyl and decyldodecyl compounds may also be used. These cations can be combined with any of the anions, that is, those represented by X in the above formula. Preferred quaternary ammonium alkyl salts are alkyldimethylbenzylammonium lauryl sulfate (Barquat LS) and didecyldimethylammonium lauryl sulfate (DDA-LS) and the corresponding alkyl carboxylate. The sulfonate, phosphate, and phosphite salts of the quaternary ammonium alkyl salts are also of interest. These are new compositions of matter.

A preferred quaternary ammonium lauryl sulfate is an alkyldimethylbenzyl ammonium lauryl sulfate containing an allyl group containing 8 to 22 carbon atoms. Alkyldimethylbenzyl ammonium lauryl sulfate may be made by processes known to those skilled in the art. An alkyldimethylbenzyl ammonium chloride may be reacted with sodium lauryl sulfate in water at a temperature of about 60° C. A white precipitate of alkyldimethylbenzyl ammonium lauryl sulfate is formed after about half an hour. The reaction is as follows:

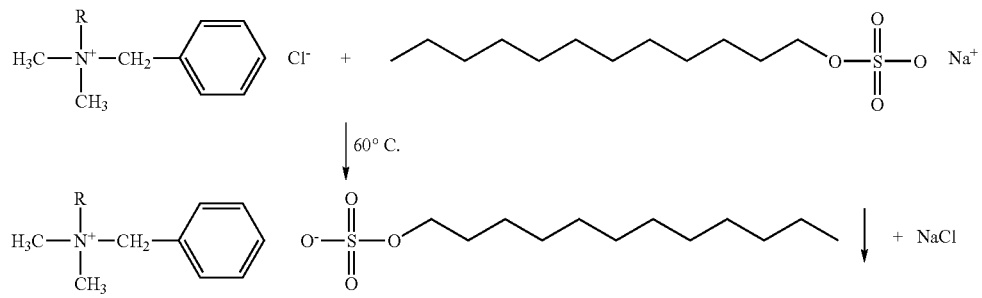

wherein R is a $C_1$-$C_{25}$ alkyl group, preferably a $C_{10}$-$C_{12}$ group.

The reaction temperature ranges from 20° to 140° C., preferably 60° C. The molar ratio of alkyldimethylbenzyl ammonium chloride to sodium lauryl sulfate ranges from about 1:3 to about 3:1, preferably about 1:1. The solvent may be water or an organic solvent. If the reaction takes place in an organic solvent, sodium chloride is precipitated and the quaternary ammonium lauryl sulfate remains in solution. The organic solvent may be, for example, lower alcohols, acetone and dichloromethane. The quaternary ammonium lauryl sulfate is collected after the organic solvent evaporates off.

The polymers used in the polymer-wood composition are virgin polymers which include, but are not limited to, polyolefins and polyvinyl compounds, as for example, HDPE, LDPE, LLDPE, UHMWPE, polypropylene (homo- and copolymer), PVC, and combinations thereof. A preferred polyolefin is HDPE, available as a "barefoot" (no additives) reactor from powder (Equistar® LB100-00) having a 0.4 Melt Index (MI). This polyolefin is a product from Equistar Chemicals LP of Houston, Tex.

The extrudable and extruded polymer-cellulosic fiber composites of the present invention contain the ingredients in the following Table 1 (weight percentages are based on the weight of the total composition):

TABLE 1

| Ingredients | Amount | Preferred Amount |
|---|---|---|
| Polymer | About 30 to 70 wt. % | About 40 to 60 wt. % |
| Cellulosic Fiber | About 70 to 30 wt. % | About 60 to 40 wt. % |
| Quaternary ammonium alkyl salt | About 1 to 7 phc | About 2 to 5 phc |

A wide variety of cellulosic fibers can be employed in the composite of the present invention. Illustrative cellulosic fibers include, but are not limited to, wood and wood products, such as wood pulp fibers; agricultural wastes such as non-woody paper-making fibers from cotton; from straws and grasses, such as rice and esparto; from canes and reeds, such as bagasse; from bamboos; from stalks with bast fibers, such as jute, flax, kenaf, cannabis, linen and ramie; from leaf fibers, such as abaca and sisal; from shells from coconut, peanuts and walnuts; and corn stalks, wheat, oat, barley and oat chaff, and hemp. Suitably, the cellulosic fiber used is from a wood source. Suitable wood sources include softwood sources such as pines, spruces, cedar, and firs, and hardwood sources such as oaks, maples, eucalyptuses, poplars, beeches, and aspens. One or more cellulosic fibers may be used.

The cellulosic fibers may be screened through various screens, e.g., a 30-mesh or a 40-mesh screen, to obtain a mixture of different size fibers. The size of the fibers used in the composition of the invention ranges from about 10 to about 100 mesh, and preferably from about 40 to about 100 mesh.

The wood flours used in the composition include those obtained from soft and hard woods and combinations thereof. Preferable wood flours are from oak and pine, available as Oak 4037 (40 mesh) and Pine 402050 (40 mesh), respectively, from American Wood Fibers of Schofield, Wis. Another preferred wood flour is from maple.

Quaternary ammonium alkyl salt improves the internal and external lubricity of the plastic blends. The internal lubricity enhances the dispersion of the reinforcing filler in the polymer, thus improving the physical properties and increasing the extruder output. The principal benefit of the external lubricity is to improve the surface appearance of the extruded article by reducing the force needed to move the extrudable composition through the dye.

Quaternary ammonium alkyl salt also acts as an antimicrobial which improves decay resistance of the polymer-wood composites. They may be used with other biocides which include, but are not limited to, copper compounds, zinc compounds, azoles, isothiazolones, and carbamates.

Examples of known antimicrobial compounds which may be used with the quaternary ammonium alkyl salts are quaternary ammonium compounds such as diethyldodecylbenzyl ammonium chloride: dimethyloctadecyl-(dimethylbenzyl) ammonium chloride; dimethyldidecyl ammonium chloride; dimethyldidodecyl ammonium chloride; trimethyl-tetradecyl ammonium chloride; benzyldimethyl ($C_{12}$-$C_{18}$ alkyl) ammonium chloride; dichlorobenzyldimethyldodecyl ammonium chloride; hexadecylpyridinium chloride; hexadecylpyridinium bromide; hexadecyltrimethyl ammonium bromide; dodecylpyridinium chloride, dodecylpyridinium bisulphate; benzyldodecyl-bis(betahydroxyethyl) ammonium chloride; dodecylbenzyltrimethyl ammonium chloride; benzyldimethyl ($C_{12}$-$C_{18}$ alkyl) ammonium chloride; dodecyldimethylethyl ammonium ethylsulphate; dodecyldimethyl-(1-naphthylmethyl) ammonium chloride; hexadecyldimethylbenzyl ammonium chloride; dodecyldimethylbenzyl ammonium chloride and 1-(3-chloroallyl)-3,5,7-triaza-1-azonia-adamantane chloride; urea derivatives such as 1,3-bis(hydroxymethyl)-5,5-dimethylhydantoin; bis(hydroxymethyl) urea; tetrakis(hydroxymethyl) acetylene diurea; 1-(hydroxymethyl)-5,5-dimethylhydantoin and imidazolidinyl urea; amino compounds such as 1,3-bis(2-ethylhexyl)-5-methyl-5-aminohexahydropyrimidine; hexamethylene tetra amine; 1,3-bis(4-aminophenxoy)propane; and 2-[(hydroxymethyl)amino]ethanol; imidazole derivatives such as 1[2-(2,4-dichlorophenyl)-2-(2-propenyloxy)ethyl]-1H-imidazole; 2-(methoxycarbonylamino)benzimidazole; nitrile compounds such as 2-bromo-2-bromomethylglutaronitrile, 2-chloro-2-chloromethylglutaronitrile, 2,4,5,6-tetra-chloroisophthalodinitrile; thiocyanate derivatives such as methylene bis thiocyanate; tin compounds or complexes such as tributyltin-oxide, chloride, naphthoate, benzoate or 2-hydroxybenzoate; isothiazolin-3-ones such as 4,5-trimethylene-4-isothiazolin-3-one, 2-methyl-4,5-trimethylene-4-isothiazolin-3-one, 2-methylisothiazolin-3-one, 5-chloro-2-methylisothiazolin-3-one, benzisothiazolin-3-one, 2-methylbenzisothiazolin-3-one, 2-octylisothiazolin-3-one, 4,5-dichloro-2-N-octyl-4-isothiazolin-3-one; thiazole derivatives such as 2-(thiocyanomethylthio)-benzthiazole; and mercaptobenzthiazole; nitro compounds such as tris(hydroxymethyl)nitromethane; 5-bromo-5-nitro-1,3-dioxane and 2-bromo-2-nitropropane-1,3-diol; α-(4-chlorophenyl)-α-(1-cyclopropylethyl)-1H-1,2,4-triazole-1-ethanol (Cyproconazole); 1-[[2-(2,4-dichlorophenyl)4-propyl-1,3-dioxolan-2-yl]methyl]-1H-1,2,4-triazole (Propiconazole); α-[2-(4-chlorophenyl)ethyl]-α-phenyl-1H-1,2,4-triazole-1propanenitrile (Fenbuconazole); α-butyl-α-(4-chlorophenyl)-1H-1,2,4-triazole-1-propanenitrile (Myclobutanil); α-[2-(4-chlorophenyl)ethyl]-α-(1,1-dimethylethyl)-1H-1,2,4-triazole-1-ethanol (Tebuconazole); 1-(4-chlorophenoxy)-3,3-dimethyl-1-(1H-1,2,4-triazol-1-yl)-2-butanone (Triadimefon); iodine compounds such as iodopropynyl butyl carbamate and tri-iodo allyl alcohol; aldehydes and derivatives such as glutaraldehyde (pentanedial), p-chlorophenyl-3-iodopropargyl formaldehyde and glyoxal; amides such as chloracetamide; N,N-bis(hydroxymethyl) chloracetamide; N-hydroxymethyl-chloracetamide and dithio-2,2-bis(benzmethyl amide); guanidine derivatives, such as, poly hexamethylene biguanide and 1,6-hexamethylene-bis[5-(4-chlorophenyl)biguanide]; thiones such as 3,5-dimethyltetrahydro-1,3,5-2H-thiodiazine-2-thione; triazine derivatives such as hexahydrotriazine and 1,3,5-tri-(hydroxyethyl)-1,3,5-hexahydrotriazine; oxazolidine and derivatives thereof, such as, bis-oxazolidine; furan and derivatives thereof such as 2,5-dihydro-2,5-dialkoxy-2,5-dialkylfuran; carboxylic acids and the salts and esters thereof such as sorbic acid and the salts thereof and 4-hydroxybenzoic acid and the salts and esters thereof; boric acids and its zinc complexes; phenol and derivatives thereof, such as, 5-chloro-2-(2,4-dichlorophenoxy)phenol; thio-bis(4-chlorophenol) and 2-phenylphenol; sulphone derivatives, such as, diiodomethyl-paratolyl sulphone, 2,3,5,6-tetrachloro-4-(methylsulphonyl) pyridine and hexachlorodimethyl sulphone; thioamides, such as, dimethyldithiocarbamate and its metal complexes, ethylenebisdithiocarbamate and its metal complexes, 2-mercaptopyridine-N-oxide and its metal complexes; and copper amine complexes including, but not limited to, ammonium/copper complexes, ethanolamine/copper complexes, diethanolamine/copper complexes, triethanolamine/copper complexes, diethylamine/copper complexes, ethylene diamine/copper complexes, and any combination of the foregoing.

From 0.001% to 3.0 wt. % based on weight of wood of other biocides may be added.

Coupling, compatabilizing, or mixing agents may advantageously be present in the polymeric composite. These additives may be present in an amount of from about 0.01 to about 20 wt. % based on the total weight of the composition, preferably, about 0.1 to about 10 wt. %, and most preferably from about 0.2 to 5 wt. % to achieve improvements in the physical, mechanical and thermal characteristics of the materials. A preferred compatabilizer is maleated polypropylene, present in an amount ranging from about 1 to about 5 wt. %. Talc may be present in an amount from about 2 wt. % to about 10 wt. %, based on the total weight of the composition. Other additives can be used, including viscosity stabilizers, inorganic fillers, processing aids, and coloring agents.

In addition to extrusion, the compositions of this invention may be injection molded to produce commercially usable products. The resultant product has an appearance similar to wood and may be sawed, sanded, shaped, turned, fastened and/or finished in the same manner as natural wood. It is resistant to rot and decay as well as termite attack and may be used, for example, as decorative moldings inside or outside of a house, picture frames, furniture, porch decks, window moldings, window components, door components, roofing systems and other types of structural members.

The following examples are illustrative of the invention:

EXAMPLE 1

Preparation of Quaternary Ammonium Lauryl Sulfate

A. Seventy grams of sodium lauryl sulfate (Aldrich® product 70% dodecyl sulfate, 25% tetradecyl sulfate and 5% hexadecyl sulfate) were added to 1000 ml of distilled water in a 2 liter flask equipped with a condenser. The mixture was stirred and slowly heated to about 60° C. After the sodium lauryl sulfate was completely dissolved in the water and the temperature of the solution reached 60° C., 100 grams of Barquat® MB-80 (80% active solution of alkyldimethylbenzyl ammonium chloride) were added to the solution. The resulting mixture was maintained at 60° C. for about 0.5 hour. A white precipitate of alkyldimethylbenzyl ammonium lauryl sulfate formed and was filtered. About 500 ml of distilled water was used to wash any residual sodium chloride on the precipitate. After washing, the precipitate was collected and left in a fume hood for 3 days for air-drying.

The structure of the alkyldimethylbenzyl ammonium lauryl sulfate was confirmed by nuclear magnetic resonance (NMR) analysis. The melting point was measured by differential scanning calorimeter. Since the composition contains an admixture of the material obtained from the dodecyl sulfate, tetradecyl sulfate, and hexadecyl sulfate, their melting points were detected for this compound, namely, 50° C., 100° C., and 130° C., respectively.

B. Didecyldimethyl ammonium lauryl sulfate was made by reacting didecyldimethyl ammonium chloride with sodium lauryl sulfate using the foregoing procedure.

The structure of didecyldimethyl ammonium lauryl sulfate was confirmed by NMR. The m.p. for this product is 45° C., 55° C., and 140° C.

C. The quaternary ammonium alkyl carboxylate, sulfonate, phosphate, and phosphite salts can be made by reacting a quaternary ammonium chloride with, as for example, sodium salts of alkyl carboxylate, alkyl sulfonate, alkyl phosphate, and alkyl phosphite, respectively, by following the above procedures.

The efficacy of aqueous solutions of alkyldimethylbenzyl ammonium lauryl sulfate and didecyldimethyl ammonium lauryl sulfate to inhibit fungus growth was evaluated by the agar plate method known in the art. Also tested were two commercially known biocides: didecyldimethyl ammonium chloride (Bardac® 2080) and alkyldimethylbenzyl ammonium chloride (Barquat® MB-80).

The results of the agar plate tests are shown in Table 2. The test data are reported as a percent inhibition (retardation) of the fungal growth.

TABLE 2

| Sample ID | Conc. ppm | T. versicolor | G. trabeum | P. placenta | C. globosum |
|---|---|---|---|---|---|
| Didecyldimethyl ammonium chloride Bardac ® 2080 | 500 | 80.7 | 82.4 | 89.2 | 74.3 |
| | 50 | 36.8 | 78.4 | 88.4 | 68.2 |
| Alkyl* dimethyl-benzyl ammonium chloride Barquat ® MB-80 | 500 | 85.0 | 89.0 | 87.5 | 81.8 |
| | 50 | 55.0 | 82.1 | 86.8 | 63.8 |
| Alkyl* dimethyl-benzyl ammonium lauryl sulfate | 500 | 72.9 | 82.3 | 86.6 | 75.6 |
| | 50 | 32.2 | 51.7 | 83.0 | 64.5 |
| Didecyldimethyl ammonium lauryl sulfate | 500 | 81.3 | 80.8 | 86.0 | 78.7 |
| | 50 | 44.0 | 58.0 | 82.6 | 68.0 |

*40% $C_{12}$, 50% $C_{14}$ and 10% $C_{16}$

The above table shows the lubricants of the present invention exhibit antifungal activity comparable to the two known commercial biocides tested.

EXAMPLE 2

Extruding Polymer-Wood Composites

In this example, an extrudable composition containing 40% HDPE (Petrothene reactor powder, Equistar®LB 0100-00) and 60% 40 mesh Pine 402050 (from American Wood Fibers of Schofield, Wis.) was mixed in a ten liter Henschel mixer for about three minutes at 1800 rpm. After mixing, the composites were dried for 16 hours at 100° C. in vacuum ovens under a vacuum of about 685 to about 710 mm Hg. Several samples were prepared by adding 3 phc (parts per hundred of composite) of the additives shown in Table 3 to the dried composite.

The dried compositions containing the additives were extruded through a rectangular profile 38.1×12.7 mm die in a 30 mm Werner & Pfleiderer co-rotating twin screw extruder. The extruder set temperature profile from the feed section to the die was 140°, 150°, 150°, 150°, 140° C. The composite material was fed to the extruder using a K-Tron S200 volumetric single screw feeder with a set feed rate of 16 kg/hr. The screw speed was set at 175 rpm. The extruded profile passed through a 0.65 m cooling chamber containing three sets of water sprays before being cut and collected.

The extruder torque is measured as a percent of the safe torque set for the extruder and the actual temperatures in zone 3 recorded as shown in Table 3 below. Zone 3 is the area of highest shear in the extruder. The amount of the temperature increase in this zone from the set temperature is a reflection of shear heating in the zone. A lower zone 3 temperature coupled with less extruder torque indicates an improved extruding process.

TABLE 3

| Additives | Extruder torque % | Temperature in zone 3 (° C.) |
|---|---|---|
| 3 phc Acrawax ® C/zinc stearate (control) | 64 | 164 |
| 3 phc Barquat LS* | 56 | 156 |
| 1.5% Barquat LS plus 3 phc Acrawax ® C/zinc stearate | 55 | 159 |
| 3.0% Barquat LS plus 3 phc Acrawax ® C/zinc stearate | 49 | 152 |
| 3 phc Barquat LS plus 0.1% 8-hydroxyquinoline, copper salt | 55 | 157 |
| 1.5% DDA-LS plus 3 phc Acrawax ® C/zinc stearate | 56 | 159 |
| 3.0% DDA-LS plus 3 phc Acrawax ® C/zinc stearate | 46 | 153 |

*Barquat LS is for alkyl (40% $C_{12}$, 50% $C_{14}$, 10% $C_{16}$ dimethylbenzyl ammonium lauryl sulfate and is 100% active.

The data in the above table show that extruder torque percentages and the zone 3 temperatures for runs with alkyldimethylbenzyl ammonium lauryl sulfate, either alone or in combination with another additive, were lower than the extruder torque percent and the zone 3 temperature for the control.

The extruded samples were placed in water to determine how much water the samples absorb over time. Three extruded samples of each formulation, measuring 0.5×1½×2 inches were prepared and their central thickness and weight measured. Thereafter, the samples were totally immersed in 200 ml distilled water. After 7 days, the samples were removed from the water, weighed, and their central thickness again measured. The samples were returned to the water for an additional 33 days, after which time they were weighed and measured a third time. The percentages of the water uptake and thickness swelling were calculated as follows:

Water uptake %=$(W_2-W_1)/W_1 \times 100$, where $W_1$ is the sample weight before soaking in the water and $W_2$ is the sample weight after soaking in the water.

Thickness swelling %=$(T_2-T_1)/T_1 \times 100$ where $T_1$ is the central thickness of the sample before soaking in the water and $T_2$ is the central thickness of the sample after soaking in the water.

The average percent of the water uptake and thickness swell are shown in Table 4:

TABLE 4

| | Water uptake | | Thickness Swell | |
|---|---|---|---|---|
| Additives | 7 days (%) | 40 days (%) | 7 days (%) | 40 days (%) |
| 3 phc Acrawax ® C/zinc stearate (control) | 7.65 | 17.69 | 1.65 | 6.03 |
| 3 phc Barquat LS | 5.12 | 12.64 | 1.44 | 3.02 |
| 1.5% Barquat LS plus 3 phc Acrawax ® C/zinc stearate | 6.45 | 15.55 | 1.50 | 4.21 |
| 3.0 Barquat LS plus 3 phc Acrawax ® C/zinc stearate | 5.71 | 14.14 | 1.45 | 3.92 |

TABLE 4-continued

| | Water uptake | | Thickness Swell | |
|---|---|---|---|---|
| Additives | 7 days (%) | 40 days (%) | 7 days (%) | 40 days (%) |
| 3 phc Barquat LS plus 0.1% 8-hydroxyquinoline, copper salt | 5.25 | 11.80 | 1.45 | 3.93 |
| 1.5% DDA-LS plus 3 phc Acrawax ® C/zinc stearate | 7.02 | 17.52 | 1.58 | 5.36 |
| 3.0% DDA-LS plus 3 phc Acrawax ® C/zinc stearate | 7.52 | 16.42 | 1.56 | 5.23 |

As shown in Table 4, the composites made with Barquat LS either alone or in combination with another additive absorbed less water and had less thickness swell than the control alone.

The efficacy of extruded samples containing alkyldimethylbenzyl ammonium lauryl sulfate or didecyldimethyl ammonium lauryl sulfate to inhibit fungal growth was evaluated by the standard soil block test method (American Wood Preservation Association E10) known in the art. The biocide effectiveness is determined by % weight loss in wood component of the tested samples. The sample blocks (13 mm×14 mm×14 mm) were exposed to the brown-rot fungus G. trabeum for 22 weeks, with four replicates per treatment.

The results, presented in Table 5, clearly show that the extruded samples containing alkyldimethylbenzyl ammonium lauryl sulfate or didecyldimethyl ammonium lauryl sulfate had significantly lower weight loss than the control samples which contain the conventional lubricant (N,N ethylene bis-stearamide and zinc stearate). This illustrated that the addition of alkyldimethylbenzyl ammonium lauryl sulfate or didecyldimethyl ammonium lauryl sulfate inhibits brown-rot fungal growth to a substantially great extent.

TABLE 5

Summary of Average Percentage of Weight Loss for Extruded Woodfiber Plastic Composites (60% of Pine Powder and 40% of HDPE)

| Additives | Average weight loss (%) |
|---|---|
| 3 phc Acrawax ® C/zinc stearate | 21.0 |
| 3 phc Acrawax ® C/zinc stearate with 1.5% Barquat-LS (based on wood weight) | 1.7 |
| 3 phc Acrawax ® C/zinc stearate with 3.0% Barquat-LS (based on wood weight) | 1.7 |
| 3 phc Barquat-LS | 1.4 |
| 3 phc Barquat-LS with 0.1% 8-hydroxyquinoline, copper salt (based on wood weight) | 0.9 |
| 3 phc Acrawax ® C/zinc stearate with 1.5% DDA-LS (based on wood weight) | 2.8 |
| 3 phc Acrawax ® C/zinc stearate with 3.0% DDA-LS (based on wood weight) | 2.5 |

Samples containing the blend of alkyldimethylbenzyl ammonium lauryl sulfate and 8-hydroxyquinoline, copper salt (40:1 by weight) further decreased fungal growth, indicating that 8-hydroxyquinoline, copper salt, which is a wood preservative, functions as a biocide enhancer when combined with alkyldimethylbenzyl ammonium lauryl sulfate. This experiment supports that the use of other biocides as an antimicrobial enhancer with alkyldimethylbenzyl ammonium lauryl sulfate increase the biocidal activity of the combination.

All patents, applications, articles, publications, and test methods mentioned above are hereby incorporated by reference.

What is claimed is:

1. A polymer-cellulosic fiber composition comprising from about 30 to about 70 wt. % polymer, from about 70 to about 30 wt. % cellulosic fiber, and from about 1 to about 7 phc of a quaternary ammonium alkyl salt having the formula:

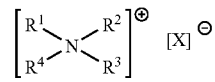

wherein X is an alkanecarboxylate O—C(O)R, alkyl sulfate $OS(O)_2OR$, alkanesulfonate $OS(O)_2R$, alkyl phosphate $OP(O)(OH)OR$, (O-) alkyl phosphonate $OP(O)(H)$—OR; R is an alkyl group having from 8 to 22 carbon atoms, and $R^1$ is a long chain alkyl group or a benzyl group and, where the $R^1$ group is a long chain alkyl group, $R^2$ and $R^3$ are short chain alkyl groups and $R^4$ is a short or long chain alkyl group and, where $R^1$ is a benzyl group, $R^2$ is a short chain alkyl group and $R^3$ and $R^4$ are each either short or long chain alkyl groups;

said long chain alkyl groups having from 8 to 22 carbon atoms and said short chain ally groups have from 1 to 4 carbon atoms.

2. The polymer-cellulosic fiber composition of claim 1, wherein the long chain alkyl group has from 8 to 22 carbon atoms and the short chain alkyl group has from 1 to 4 carbon atoms.

3. The polymer-cellulosic fiber composition of claim 1 wherein the quaternary ammonium alkyl salt is an alkyldimethylbenzylammonium lauryl, an alkyltrimethylammonium lauryl or a dialkyldimethylammonium lauryl salt, or a combination thereof.

4. The polymer-cellulosic fiber composition of claim 1, wherein the R group contains from 10 to 18 carbon atoms.

5. The polymer-cellulosic fiber composition of claim 3, wherein the alkyldimethylbenzylammonium alkyl salt is alkyldimethylbenzylammonium lauryl sulfate.

6. The polymer-cellulosic fiber composition of claim 5, wherein the alkyl group in the alkyldimethylbenzylammonium lauryl sulfate contains 40% $C_{12}$, 50% $C_{14}$ and 10% $C_{16}$.

7. The polymer-cellulosic fiber composition of claim 3, wherein the quaternary ammonium alkyl salt is didecyldimethylammonium lauryl sulfate.

8. The polymer-cellulosic fiber composition of claim 1, wherein the polymer is a high-density polyethylene.

9. The polymer-cellulosic composition of claim 1, wherein the cellulosic fiber is oak, pine, or maple, straw, corn stalks, rice hulls, wheat, oat, barley, oat chaff, coconut shells, peanut shells, walnut shells, jute, hemp, bagasse, bamboo, flax, kenaf, or a combination thereof.

10. The polymer-cellulosic composition of claim 9, further comprising about 0.001 to about 3.0 wt. %, based on weight of cellulosic fiber, of a biocide.

11. The polymer-cellulosic composition of claim 10, wherein the biocide is a copper compound, a zinc compound, an azole, an isothiazolone, a carbamate, or a combination thereof.

12. A polymer-cellulosic fiber composition consisting of from about 30 to about 70 wt. % polymer, from about 70 to about 30 wt. % cellulosic fiber, and from about 1 to about 7 phc of a quaternary ammonium alkyl salt having the formula:

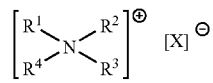

wherein X is an alkanecarboxylate O—C(O)R, alkyl sulfate $OS(O)_2OR$, alkanesulfonate $OS(O)_2R$, alkyl phosphate $OP(O)(OH)OR$, (O-) alkyl phosphonate $OP(O)(H)$—OR; R is an alkyl group having from 8 to 22 carbon atoms, and $R^1$ is a long chain alkyl group or a benzyl group and, where the $R^1$ group is a long chain alkyl group, $R^2$ and $R^3$ are short chain alkyl groups and $R^4$ is a short or long chain alkyl group and, where $R^1$ is a benzyl group, $R^2$ is a short chain alkyl group and $R^3$ and $R^4$ are each either short or long chain alkyl groups;

said long chain alkyl groups having from 8 to 22 carbon atoms and said short chain ally groups have from 1 to 4 carbon atoms.

* * * * *